July 19, 1932. W. P. ROCHE 1,867,632

COLLAPSIBLE BATTERY HANDLE

Filed Dec. 17, 1930

INVENTOR
William P. Roche
BY
Augustus B. Stoughton
ATTORNEY.

WITNESS:

Patented July 19, 1932

1,867,632

UNITED STATES PATENT OFFICE

WILLIAM P. ROCHE, OF LAKEWOOD, OHIO

COLLAPSIBLE BATTERY HANDLE

Application filed December 17, 1930. Serial No. 502,903.

The object of my invention is to provide a handle for storage batteries which shall be collapsible in use so as to require a minimum of headroom for the storage battery when mounted in an automobile or other confined location.

For a further exposition of my invention reference may be had to the annexed drawing and specification at the end whereof my invention will be specifically pointed out and claimed.

Figure 1:
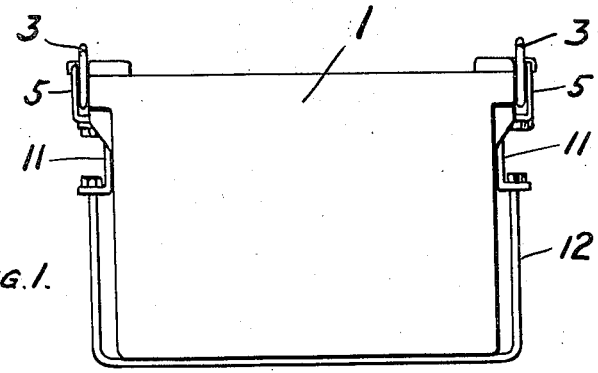
Figure 1 is a side elevation of my device.
Figure 2:
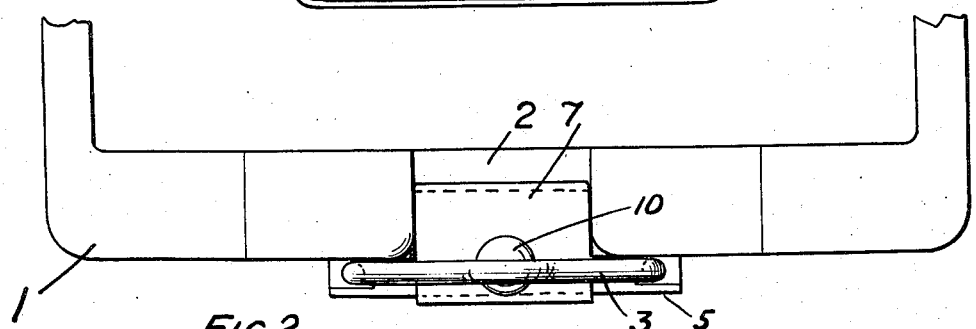
Figure 2 is a plan view showing my device applied to one end of a storage battery casing.

In the embodiment chosen for illustration in the drawing there is shown a storage battery casing generally indicated at 1 which has at its opposite ends notches 2. These notches are adapted to receive collapsible handles.

The handles consist of the grip portions 3 which have their opposite ends 4 bent under. The grip portions 3 are held in position by face plates 5 which extend over the bent ends 4. Face plates 5 have their lower ends 6 inwardly bent to cooperate with shoulders on the storage battery jar or casing 1 and their upper ends 66 inwardly bent so as to rest against the side wall of the battery casing. There are also provided above face plates 5 top plates 7 having their inner ends 8 bent so as to cooperate with another shoulder on the casing 1 and their outer ends 9 bent to receive the upper ends of the face plates 5. Face plates 5 and top plates 7 are clamped on the casing 1 by means of bolt 10 which passes through openings in the top plate and in the bent lower edge of the face plate. Bolt 10 also holds in position holddown brackets 11 which receive rods 12 for securing the battery in the car.

Figures 3, 4:
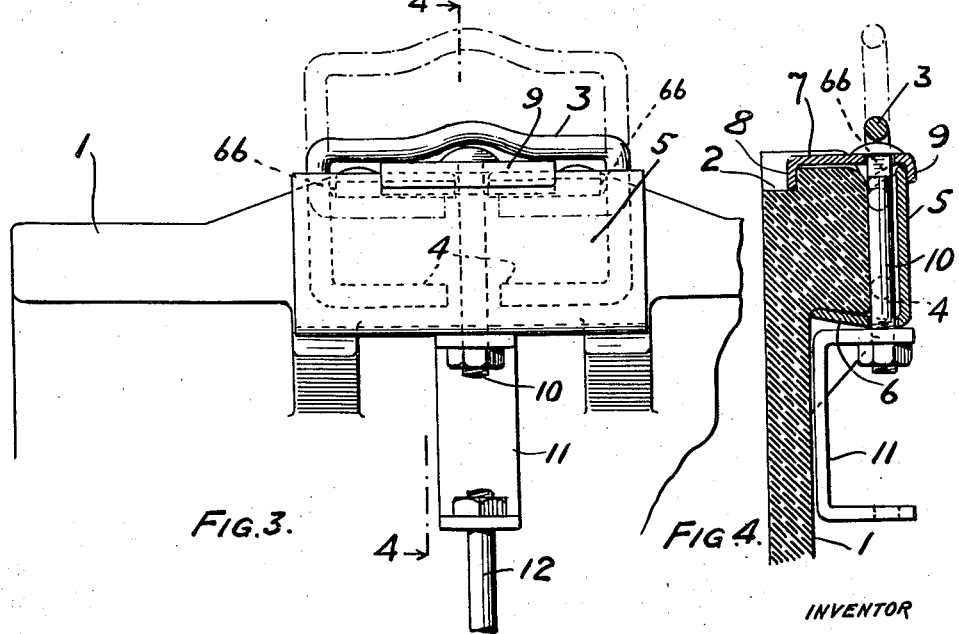
Figure 3 is a side elevation of the device shown in Figure 2.
Figure 4 is a vertical cross section on line 4—4 of Figure 3.

As will be seen from the foregoing description the grip portion 3 is slidable in the face plates 5 and the top plates 7. The grip portion 3 may therefore be allowed to collapse to the full line position shown in Figure 3 or may be lifted to the upper position so that the bent ends 4 rest beneath the bent edges 66 of face plate 5 for carrying the battery.

I do not intend to be limited in the practice of my invention save as the scope of the prior art and of the attached claim may require.

I claim:

A handle for storage battery containers comprising a grip having inturned ends with space between, a mounting in which said grip is afforded a range of sliding movement parallel with a wall of the container, said mounting comprising interengaging face and top plates, each adapted to engage a wall of the container with space between the face of the wall and the plates in which space the ends of the grip have limited sliding movement, and a bolt engaging said plates and arranged between the inturned ends of the grip and in the space provided between the plates and the container wall.

WILLIAM P. ROCHE.